July 23, 1963
F. V. PETERSON
3,098,890
LIQUID TRANSMISSIVE AND ELECTRIC CURRENT
NON-TRANSMISSIVE APPARATUS
Filed Nov. 15, 1960
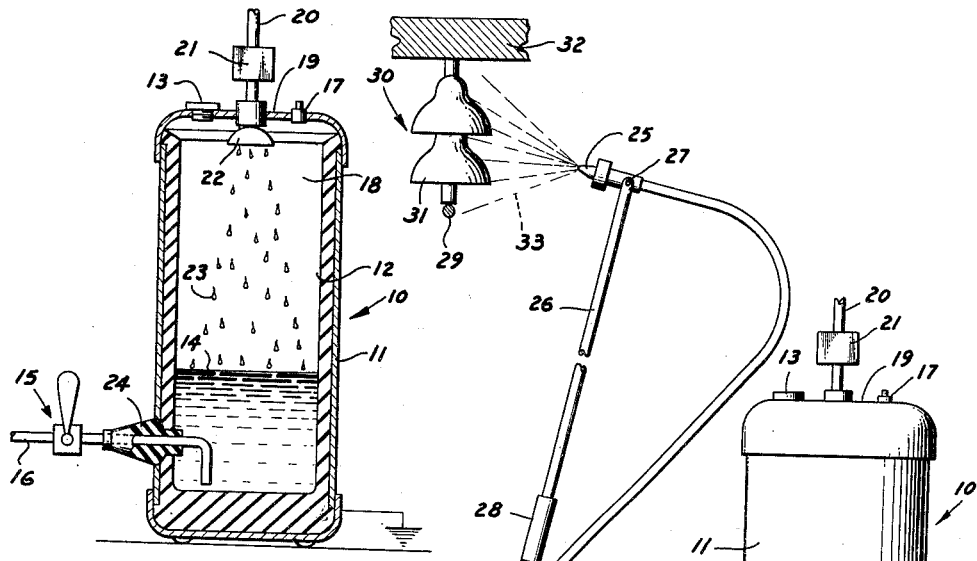
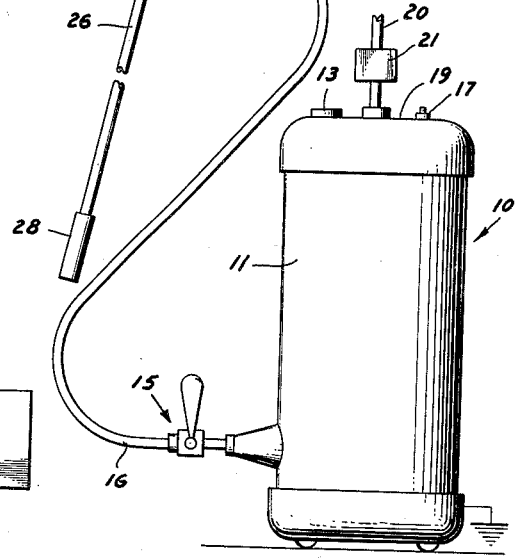
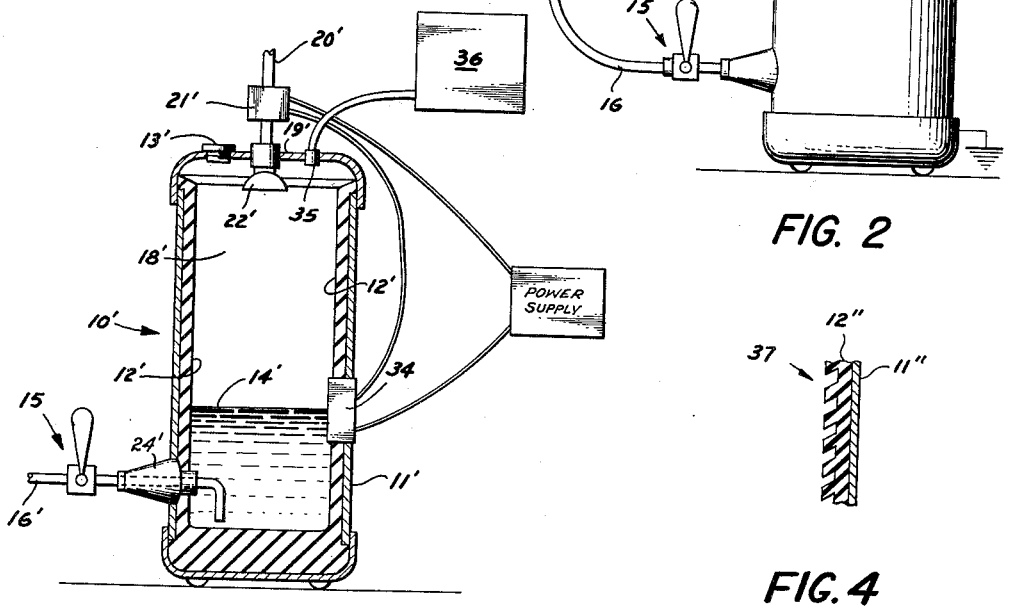
FIG. 1
FIG. 2
FIG. 3
FIG. 4
INVENTOR.
FLOYD V. PETERSON

United States Patent Office 3,098,890
Patented July 23, 1963

3,098,890
LIQUID TRANSMISSIVE AND ELECTRIC CURRENT NON-TRANSMISSIVE APPARATUS
Floyd V. Peterson, 20728 Ventura Blvd.,
Woodland Hills, Calif.
Filed Nov. 15, 1960, Ser. No. 69,441
8 Claims. (Cl. 174—5)

The present invention relates to liquid transmissive and electric current non-transmissive apparatus adapted to allow the passage therethrough of liquid while preventing the passage of electric current therethrough from a liquid input portion to a liquid output portion of the apparatus. One such type of liquid transmissive and electric current non-transmissive apparatus was initially developed for use in an electrical precipitator apparatus of the liquid spray type as disclosed in my co-pending patent application, Serial No. 830,409, filed July 29, 1959. However, since the liquid transmissive and electric current non-transmissive apparatus has numerous other useful applications beyond its use in an electrical precipitator apparatus as disclosed in by above-identified co-pending patent application, the present application is thought desirable in order to cover the liquid transmissive and electric current non-transmissive apparatus, per se.

In addition to electrical precipitators, another field of application for the present invention is in connection with washing electrical insulators which support one or more electrical conductors carrying relatively high voltage. This application of the present invention is described in detail in reference to the accompanying drawings. It is considered that the present invention will find application in a number of other fields as its possibilities become realized.

It is an object of the present invention to provide apparatus which offers a readily transmissive path to a liquid supplied under pressure greater than ambient pressure around the apparatus, with said pressurized liquid being delivered to the output portion of the apparatus at a pressure only very slightly less than said input pressure (differing therefrom by the very small pressure drop across the apparatus of the present invention), but with the apparatus being substantially electrically non-conductive from the liquid input portion to the liquid output portion of the apparatus.

It is a further object of the present invention to provide a liquid transmissive and electric current non-transmissive apparatus which is simple to construct and operate and yet which will perform its designated functions of liquid transmission and electric current isolation continuously and on a fail-safe basis.

Further objects will be apparent to persons skilled in the art after a careful study hereof.

For the purpose of clarifying the nature of the present invention, several exemplary embodiments are illustrated in the hereinbelow-described figures of the accompanying sheet of drawings, and are described in detail hereinafter.

FIG. 1 is a central vertical sectional view through one illustrative embodiment of the present invention, with the liquid flow inlet and output conduits being broken away and shown in fragmentary form.

FIG. 2 is an elevational view showing the liquid transmissive and electric current non-transmissive apparatus of FIG. 1 being used in one particular manner of the many uses of the apparatus —this particular use comprising the washing and cleaning of electrical insulators, which support an electrical conductor (or plurality thereof) while said conductor is charged with a relatively high voltage.

FIG. 3 is a vertical sectional view similar to FIG. 1, but illustrates a slightly modified form of the invention including liquid level sensing means responsive to the quantity of liquid contained in the bottom of the hollow tank means to control the inflow of liquid through a liquid flow inlet conduit means whereby to maintain the quantity of liquid in the bottom of the hollow tank means within predetermined limits, and also including means for supplying an electrical insulating gas, such as air or the like, under pressure to the hollow upper interior region of the hollow tank means and for controlling and maintaining said contained gas within predetermined pressure limits.

FIG. 4 is a fragmentary view of a portion of the tank shown in FIG. 1 and illustrates a further modification of the interior insulating wall thereof including drip-inducing means adapted to facilitate the transmission of liquid from the top of the tank to the bottom adjacent to the walls thereof while positively preventing the passage of electric current along said path.

The liquid transmissive and electric current non-transmissive apparatus of the present invention may be said to include a hollow tank means having liquid flow inlet conduit means connected to said hollow tank means adjacent the top thereof and having liquid flow outlet conduit means connected to said hollow tank means adjacent the bottom thereof; and further having spray nozzle means positioned within said hollow tank means above the bottom thereof and connected to said liquid flow inlet conduit means and adapted to be supplied with liquid under pressure therefrom, whereby to spray said liquid under pressure downwardly in the form of a plurality of fine liquid droplets interspaced or separated from each other by an electrically non-conductive gas, such as air or the like, positioned in the hollow interior upper portion of said tank means between the spray nozzle means and a quantity of the liquid contained in the bottom portion of the hollow tank means, whereby to electrically isolate and insulate said spray nozzle means from the liquid in the bottom of the tank means and also from the liquid flow outlet conduit means connected to said liquid in the bottom of the tank means. In one preferred form of the invention, the interior of the tank has an electrically non-conductive surface and at least one of the inlet and outlet conduit means connected to the tank means is electrically insulated therefrom. Furthermore, another form of the invention includes means for supplying the electrical insulating gas or air under pressure to the interior of the hollow tank means and for controlling and maintaining said gas or air in the upper portion of the hollow tank within predetermined pressure limits. Furthermore, one form of the invention may include liquid level sensing means responsive to the quantity of liquid contained in the bottom of the hollow tank means to control the inflow of liquid through the liquid flow inlet conduit means whereby to maintain the quantity of liquid in the bottom of the tank within predetermined limits.

In the specific embodiment illustrated in FIGS. 1 and 2, the above-mentioned hollow tank means takes one specific form, indicated generally at 10, comprising a pressure tank assembly having an outer shell 11 of some metal such as steel or high-strength copper, or the like, and an inner lining 12 on the bottom and sides of the tank fabricated from some suitable electrical insulating material such as phenolic resin, hard rubber, glass, plastic, or other suitable electrical insulating material. Initially, the tank 10 is filled with a desired liquid, such as water or the like, through the cap 13 to the necessary level, which, in general, may be about one-third full, as indicated at 14. The valve 15 in the liquid flow outlet conduit 16 may be closed by insulated stick operation to guard against any electrical voltages that may be encountered, where such voltages are connected with the tank's output portion. Air or some non-explosive gas is then pumped through the cap 17 into the upper hollow interior portion 18 of the tank 10 until a desired operating pressure is reached. In operation, the valve 15 is opened and input liquid is forced through the upper end 19 of the tank 10 from a liquid flow inlet conduit 20, which is adapted to be connected to a suitable source of liquid under pressure (not shown since such is well known in the art) or it may be pumped into the tank 10 by some conventional pumping means. The inflowing liquid passes through a check valve 21 and through a spray nozzle 22 positioned inside of the top end 19 of the tank 10 whereby to produce a fine spray consisting of a pluraity of droplets of liquid or water, as indicated at 23, interspersed and effectively spaced and insulated from each other by the air or gas under pressure in the upper portion 18 of the tank 10. The falling liquid spray droplets 23, downwardly emitted from the spray nozzle 22, drop onto the top surface, indicated at 14, of the quantity of liquid in the bottom of the tank 10 in a manner whereby the liquid is effectively transmitted from the top 19 to the bottom of the tank 10, while electric current flow from the top to the bottom of the tank 10 or from the liquid flow inlet conduit 20 to the liquid flow outlet conduit 16, or vice versa, is effectively prevented; thus the liquid flow outlet conduit 16 and the outlet liquid that is allowed to emerge from the bottom of the tank 10 through said liquid flow outlet conduit 16, are effectively electrically isolated from the input portion at the top of the tank 10 by reason of the tank inner lining 12 of electrical insulating material, by reason of the air or gas space between the liquid droplets 23 as they fall to the bottom of the tank 10 to join the liquid accumulated in the bottom thereof, as indicated at 14, and by reason of the insulator 24, which insulates the liquid flow outlet conduit 16 from the metal shell 11 of the tank 10. Hence an electric current non-transmissive path is established between the liquid flow inlet conduit 20 and the liquid flow outlet conduit 16.

FIG. 2 illustrates the tank means 10 of FIG. 1 with its liquid flow outlet conduit means 16, comprising a flexible tube, connected to a spray nozzle 25 and having a longitudinal guiding stick 26 made of electrical insulating material connected as indicated at 27 with respect thereto and provided with a handle 28 at the opposite end thereof for use in manually guiding the spray nozzle 25 into a proper position for cleaning purposes, such as for cleaning a high voltage electrical conductor, such as is indicated at 29 (in cross section) and which is part of a high voltage electrical power system, indicated generally at 30, and is supported by an electrical insulator 31 suspended from a cross arm 32 (shown in section). The water or liquid spray 33 emitted from the spray nozzle 25 is directed toward the insulator 31 for cleaning purposes, as indicated. The electrical energy carried by the high voltage conductor 29 will not be conducted to ground even when in close proximity to the spray nozzle 25, and even with a virtually solid liquid stream flowing from said spray nozzle 25, since the tank 10 and also the guiding stick 26 are electric current non-transmissive with respect to the spray nozzle 25.

FIG. 3 illustrates a slight modification of the tank shown at 10 in FIGS. 1 and 2, and corresponding parts in this view are indicated by similar reference numerals, primed, however. In this modification, it should be noted that liquid level sensing means, such as that diagrammatically indicated at 34 and responsive to the level of the liquid indicated at 14', may be effectively connected to the control valve 21' for controlling the inflow of water to the spray nozzle 22'. This may be accomplished electrically in the general manner indicated by having the liquid level sensing means, indicated diagrammatically at 34, be any one of a number of well known types adapted to produce an electrical signal whenever the level of the liquid, indicated at 14', reaches either of two extreme limits, upper and lower, and by having the control valve 21' be of an electrically operated type responsive to the electrical signal emanating from the liquid level sensing means 34. However, the liquid level sensing means 34 controlling the valve 21' may be pneumatically coupled, hydraulically coupled, mechanically coupled, or otherwise coupled and/or operated—and all within the scope of the present invention.

It should be noted that the modified form of the liquid transmissive electric current non-transmissive means shown in FIG. 3 includes a pressure sensing means 35 carried by the top of the tank 19' and adapted to control a source of air or gas under pressure, indicated diagrammatically at 36, in any conventional manner well known in the art so as to maintain the pressure of the air or gas in the hollow upper interior region 18' in the tank 10' within predetermined specified limits.

FIG. 4 illustrates, in fragmentary form, a slight modification of the inner wall 12 of insulating material of the form of the invention illustrated in FIG. 1 wherein it effectively includes drip-inducing means, indicated generally at 37, which is provided by reason of the fact that the insulating material 12'' is angularly channelled horizontally to provide a "skirt insulator" effect. After fabrication, the overall channelled surface may have a material applied to it which has little affinity for the water droplets. This may comprise certain silicon paints, or the like, although not specifically so limited. The spray water introduced into this modification of the invention will normally break up into droplets when running a short distance down the vertical wall lined with said channelled material as indicated at 37, and the upper part of the channels at least will stay substantially dry. Thus, the channelled wall material 12'' will provide an essentially electric current non-transmissive path between vertical points on the wall when said points are separated by at least a few channels—and this will be so even if some of the sprayed liquid condenses and runs down the channelled walls 12''.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A pressurized closed-circuit liquid-transmissive and electric-current-non-transmissive apparatus which offers a readily transmissive path to a liquid supplied to an input portion of said apparatus under an input pressure greater than that exterior of the apparatus, with said liquid being delivered to an output portion of said apparatus at an output pressure slightly less than said input pressure by a differential pressure corresponding to the pressure drop across the apparatus from the input portion to the output portion, with said output pressure being in excess of the pressure exterior of said apparatus, and with said apparatus being substantially electrically non-conductive from the liquid input portion of the liquid output portion, comprising: a hollow, sealed interior-pressure-holding tank, said tank having an electrically non-conductive interior surface; liquid flow inlet conduit means connected to said hollow tank means adjacent the top thereof; liquid flow outlet conduit means connected to said hollow tank means adjacent the bottom thereof; at least one of said conduit means connected to said tank being electrically insulated therefrom; means for pressurizing the interior of said tank to an interior pressure greater than the pressure exterior of said tank; and spray nozzle means positioned within said hollow tank above the bottom thereof and connected to said liquid flow inlet conduit means and adapted to be supplied with liquid therefrom under a pressure slightly greater than said interior pressure of said tank by a pressure difference corresponding to the pressure drop across the spray nozzle means whereby to spray said liquid under pressure downwardly in the form of a plurality of separated fine liquid droplets wh above the bottom thereof and connected to said liquid flow inlet conduit means and adapted to be supplied with liquid therefrom under a pressure slightly greater than said interior pressure of said tank by a pressure difference corresponding to the pressure drop across the spray nozzle means whereby to spray said liquid under pressure downwardly in the form of a plurality of separated fine liquid droplets interspaced by said electrically non-conductive gas whereby to electrically isolate and insulate said spray nozzle means from liquid collecting in the bottom of the tank.

8. Apparatus of the character defined in claim 7, including means responsive to the quantity of collected liquid contained in the bottom of said hollow tank to control the inflow of liquid through said liquid flow inlet conduit means whereby to maintain the quantity of collected liquid in the bottom of said tank within predetermined limits.

References Cited in the file of this patent
UNITED STATES PATENTS
2,673,232    Silsby _____ Mar. 23, 1954